Figure 1:
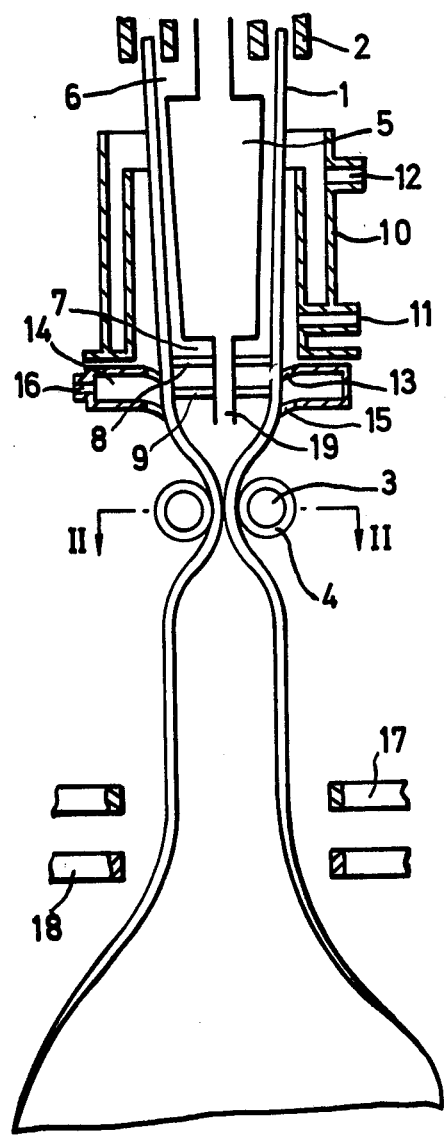

United States Patent [19]

Skilling

[11] 4,138,458

[45] Feb. 6, 1979

[54] COOLING THERMOPLASTIC TUBES

[75] Inventor: Derek Skilling, Dumfries, Scotland

[73] Assignee: Imperial Chemical Industries Limited, London, England

[21] Appl. No.: 816,664

[22] Filed: Jul. 18, 1977

[30] Foreign Application Priority Data

Aug. 13, 1976 [GB] United Kingdom ............... 33804/76

[51] Int. Cl.[2] .............................................. B29C 17/00
[52] U.S. Cl. ................................ 264/540; 264/178 R; 264/210 R; 264/237; 425/71; 425/326.1
[58] Field of Search ............... 264/95, 89, 284, 178 R; 425/326.1, 71, 72; 264/237, 210 R

[56] References Cited

U.S. PATENT DOCUMENTS

| 2,976,567 | 3/1961 | Jones et al. | 264/284 |
| 3,060,515 | 10/1962 | Corbett | 264/284 |
| 3,555,603 | 1/1971 | Haley | 425/326.1 |
| 3,700,763 | 10/1972 | Van Kralingen | 264/95 |
| 3,819,776 | 6/1974 | Robinson et al. | 264/95 |
| 3,950,466 | 4/1976 | Hasler | 264/210 R |
| 3,954,360 | 5/1976 | Skilling | 425/71 |

Primary Examiner—Jeffery R. Thurlow
Attorney, Agent, or Firm—Cushman, Darby & Cushman

[57] ABSTRACT

Tubular film-forming system in which a tubular extrudate is rapidly cooled and the cooled tube is withdrawn by engagement with a movable fluid-shedding surface which firmly grips the tube without damaging the surface thereof. The system is particularly suitable for gripping a tube the surface of which is moistened by liquid from an annular cooling bath.

9 Claims, 2 Drawing Figures

U.S. Patent   Feb. 6, 1979   4,138,458

COOLING THERMOPLASTIC TUBES

This invention relates to the production of tubular films, and, in particular, to a method and apparatus for cooling and withdrawing an extruded tube of thermoplastic material.

Oriented tubular film is usually produced by extruding a relatively thick-walled thermoplastic tube from an annular orifice, and subsequently stretching the extruded tube, at a temperature above the glass transition temperature (Tg) and below the melting temperature of the thermoplastic material, in the transverse and/or longitudinal directions to form a thin film, the stretching being effected in the transverse direction by means of internal gas pressure and in the longitudinal direction by withdrawing the tube at an accelerated rate in the direction of extrusion. In the case of oriented films produced from crystallisable polyesters, the polyester should be in a substantially amorphous state when stretched, and the extrudate must therefore be rapidly cooled, prior to reheating and stretching, to retain the polymer in the amorphous state. Likewise, in the formation of oriented films from crystalline polymers, such as polyolefins, it is necessary to cool the extrudate to produce sufficient nuclei to ensure that individual spherulites remain small, thereby enabling the extruded tube to be readily stretched, when reheated, to yield a transparent film.

Cooling of the extruded tube is conveniently effected internally and/or externally. For example, the tube may be internally cooled by means of a cooling mandrel located within the tube in the vicinity of the die from which the tube is extruded, while external cooling may be effected by passing the tube through a bath of cooling liquid. By simultaneously cooling the exterior and interior surfaces of the extruded tube, increased rates of film production may be achieved.

To ensure the production of a uniformly oriented tubular film it is important to withdraw and forward the cooled tube to the orienting stage at a carefully controlled rate. This is generally effected by conveyor means, such as a pair of cooperating nip rolls, designed to grip the external surface of the cooled tube. However, it is difficult to grip the tube securely without damaging the surface thereof, and, in practice, there is a tendency for the conveyor means to slip relative to the tube surface. Consequently, the withdrawal rate of the cooled tube is imprecisely controlled, and non-uniformly oriented tubular film may be produced from the tube. In addition, when cooling of the extruded tube is effected by means of an internal mandrel, the lack of a firm, constant, withdrawing traction may permit the tube to stick or "lock on" to the mandrel, which must then be removed for cleaning with consequent disruption of the film-forming process. "Lock on" is particularly prevalent during the initial stages of the process while the extruded tube is being threaded through the film-forming assembly.

We have now devised an improved system for withdrawing a cooled or quenched tubular extrudate.

Accordingly, the present invention provides an apparatus for the production of a polymeric tubular film comprising an annular orifice for extruding a polymeric material in the form of a tube, means for cooling the extruded tube, means for withdrawing the cooled tube, said withdrawing means comprising a fluid-shedding surface, as hereinafter defined, movable in withdrawing engagement with the external surface of the tube, and means downstream of the withdrawing means for stretching the withdrawn tube to form an oriented tubular film.

The present invention also provides a method for producing a polymeric tubular film comprising extruding a polymeric material in the form of a tube, cooling the extruded tube, withdrawing the cooled tube by engaging the external surface thereof with a fluid-shedding surface, as hereinafter defined, movable to withdraw the cooled tube, and stretching the withdrawn tube to form an oriented tubular film.

By a "fluid-shedding surface" is meant a surface capable of dispersing or conveying a fluid, particularly a liquid, away from the interface between the external surface of the cooled tube and the withdrawing means to increase the frictional coefficient therebetween.

The tube withdrawal system of the present invention is suitably, but not necessarily, operated in conjunction with an internal mandrel system for cooling and dimensioning the freshly extruded tube. A suitable lubricated mandrel system for the production of tubular polymeric films is described in British Pat. No. 1 284 321 which relates to the cooling of an extruded tube by passing the tube over an internal cooling mandrel, continuously supplying a thin (e.g. 200 to 500 $\mu$m) sheath of heat-transfer liquid to between the mandrel and the tube, maintaining, at the end of the mandrel remote from the extruder, a head of liquid capable of exerting pressure on the sheath of liquid, and withdrawing the liquid from the head, wherein the pressure of the liquid between the mandrel and the tube at any one point is greater than the pressure on the outside of the tube at that point. As disclosed in British Pat. No. 1 284 321, the internal mandrel cooling system is preferably employed in conjunction with an external cooling system, such as a liquid cooling bath encircling the tube, so that simultaneous cooling of the internal and external surfaces of the tube is effected.

In the absence of internal cooling means, the external surface alone of the extruded tube may be cooled to a solidified state by contact with a sheath of liquid cooling medium (e.g. 200 to 1300 $\mu$m) supplied to an annular passageway, or "weir" system, through which the tube may be passed, as disclosed in British Pat. No. 741,963.

Oriented film may be produced from the solidified tube, formed by quenching the molten polymeric tube extruded from the annular orifice, by withdrawing the solidified tube from the cooling zone, reheating and inflating the tube by the so-called "bubble" process to introduce transverse orientation, and simultaneously elongating the tube longitudinally, i.e. in the direction of extrusion, to orient the film in a lengthwise direction. The film is then preferably "heat-set", i.e. dimensional stability of the film is improved by heating the film, while restrained against thermal shrinkage, to a temperature above the glass transition temperature of the polymer from which the film is formed but below the melting point thereof.

The withdrawing means may be of any form which provides a movable surface capable of gripping the solidified tube, and withdrawing the latter from the cooling zone at a constant rate. For example, at least a pair of cooperating movable surfaces, such as endless belts, arranged to provide longitudinal gripping surfaces for the tube may be employed, as disclosed in British Pat. No. 942 085. In practice, the withdrawing means conveniently comprises a pair of cooperating nip rolls, preferably dimensioned so that the solidified tube is collapsed across only the central part of its width, the tube thereby assuming a dumb-bell configuration which avoids the formation of edge creases in the resultant film.

The surface of the withdrawing means, such as nip rolls, which engages the tube surface is adapted to transfer fluid, particularly a liquid — such as water, from the interface between the tube and the withdrawing means so that the latter achieves a firm gripping engagement with the tube surface. The facility of conducting or displacing a fluid, and particularly a liquid, from the interface is especially important when a cooling medium is directed against the external surface of the extruded tube. In particular, the use of an external liquid cooling bath encircling the extruded tube inevitably, despite the most stringent sealing arrangements, results in a moistening of the tube surface which causes the withdrawing means to slip in contact with the tube surface.

Directing a stream of gas at the interface to remove moisture has not proved satisfactory, nor has the provision of nip rolls with abraded or roughened surfaces, the latter exhibiting a tendency to damage the tube surface. A significant improvement in gripping efficiency has however been achieved by the provision of nip rolls the surface of which incorporates a pattern of grooves or channels which serve to wipe the moisture from the tube surface, and cause the accumulated moisture to flow out of the nip region. Effectively, therefore, the withdrawing surface is provided with a tread pattern which displaces fluid from the interface.

The tread or groove pattern may be provided on the withdrawing surface by conventional techniques-such as molding, etching or machining, depending on the material from which the withdrawing surface is formed. In the case of nip rolls, the roll surface is suitably of a hard resilient material, such as rubber, into which the desired groove pattern can be introduced by machining.

The pattern of grooves on the withdrawing surface can be selected to provide an effective channelling of fluid away from the tube surface, and in the case of cylindrical nip roll withdrawing means a particularly effective liquid-shedding behaviour has been achieved by means of a series of inclined, intersecting helical grooves which provide a regular pattern of rhombic lands on the surface of at least one, and preferably each, of the nip rolls. Preferably, the rhombic lands are arranged on the roll surface so that a diagonal (the major diagonal in the case of a non-square rhombus) of each rhombus is directed substantially parallel to the axis of rotation of the nip roll. Such an arrangement, providing a plurality of substantially continuous channels from the central region of the roll surface to an edge thereof, facilitates the transfer of liquid in a generally axially outward direction towards the ends of the nip rolls so that the gripping action thereof is not impaired.

The grooves in the withdrawing surface may be of any convenient cross-section — such as, rectangular, or semicircular, provided they are capable of removing the desired amount of fluid.

To ensure that the tube is firmly gripped without sustaining superficial damage it is preferred that the pressure exerted by the nip rolls on the tube surface is maintained at a value of at least 80 pounds per linear inch (14 kg/cm) of the tube-engaging surface of the nip roll, and preferably within a range of from 90 to 170 lb/in (16 to 30 kg/cm). A satisfactory balance between fluid-shedding and traction in the nip is achieved when the surface area of the lands is at least 50%, and preferably from 70% to 95%, of the tube-engaging surface of each nip roll.

The withdrawing means should be located at a position where the extruded tube has solidified sufficiently to avoid adhesion between the opposed areas of the inner surface of the tube when the latter is collapsed. In practice, the withdrawing means are located closely beyond the downstream end of the mandrel, or other means, employed to quench the extruded tube.

Although the technique of the present invention may be employed to cool tubes derived from any tube-forming materials, the technique is preferably employed in relation to the production of tubular films from any thermoplastic polymeric material.

Suitable thermoplastic polymeric materials include polycarbonates, polysulphones, polyamides such as polyhexamethylene adipamide or polycaprolactam, polyesters such as polyethylene terephthalate and polyethylene-1, 2-diphenoxyethane-4, 4'-dicarboxylate, vinyl polymers and copolymers, and polymers and copolymers of 1-olefins such as ethylene, propylene, butene-1, 4-methylpentene-1. A preferred material is a high molecular weight stereoregular predominantly crystalline polymer of propylene, either in the form of a homopolymer or copolymerised with minor quantities (e.g. up to 15% by weight of the copolymer) of other unsaturated monomers, such as ethylene.

The technique is also applicable to multiple-layer tubes, formed by means of an annular, multi-channel coextrusion die, and intended for conversion to a multiple-layer film, such as a polypropylene substrate having on at least one surface thereof a layer of a copolymer of propylene (80 to 95% by weight) with another alpha-olefin containing from 4 to 10 carbon atoms, such as butene-1.

Films made according to the present invention may contain any of the additives conventionally employed in the production of thermoplastic films, and may be subjected to conventional after-treatments — for example, exposure to a corona discharge treatment to improve the bonding and print-receptive characteristics of the film surface. Such films may vary in thickness depending on the intended application, but usually we find that films having a thickness of from 2 to 150 microns are of general utility. Films intended for use in packaging operations are suitably within a thickness range from 10 to 50 microns.

Figure 2:
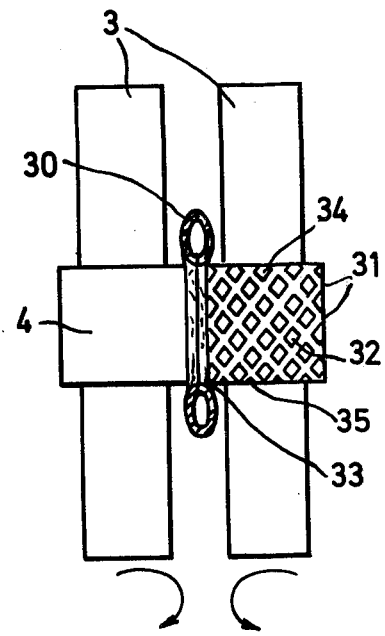

The invention is illustrated by reference to the accompanying drawings in which:

FIG. 1 is a schematic elevation depicting the production of an oriented tubular polymeric film using a liquid-shedding nip roll assembly to withdraw an extruded tube from a mandrel and a water bath cooling system, FIG. 2 is a plan view of the nip roll assembly along the line II II of FIG. 1.

Referring to FIG. 1, a tube of thermoplastic material 1 is shown being extruded downwardly from an annular extrusion die 2. The tube is withdrawn in the direction of extrusion from the die by a pair of contra-rotating nip rolls 3 which have a liquid-shedding, tube-gripping surface 4 of width less than the collapsed tube. The rolls 3 withdraw the tube at a rate greater than that at which it is extruded, thus hauling the tube down on to a tapered cooling mandrel 5 situated inside the tube, and forwarding the cooled tube for further treatment. Water is supplied to between the tube and the mandrel by maintaining a small head of water in the space 6 at the top of the mandrel. Water is therefore carried down between the mandrel 5 and the tube 1 into the space 7 formed between the bottom of the mandrel and a resilient sealing member 8. Water is removed from this space through a pipe (not shown) which passes through the centre of the mandrel.

Below sealing member 8 is positioned a circular sponge 9 which contacts the inside of the tube 1 to remove moisture which passes the seal. This moisture is removed from the sponge 9 by applying vacuum through a suction pipe (not shown).

In practice an intermediate sealing member is usually positioned between sealing member 8 and sponge 9 together with means to pressurise the tube in this region, and to control the extent to which water from space 7 penetrates between the mandrel and the tube, but these details are omitted for clarity.

As well as being cooled internally, the tube 1 is cooled externally by passage through a water bath 10 which surrounds the tube. Water is continually introduced into the water bath through pipe 11 and flows out through pipe 12, escape of water in the downstream direction being prevented by an annular resilient sealing member 13. After passing through the water bath, the tube passes through a chamber 14, sealed by a further annular resilient sealing member 15, vacuum being applied to the outside of the tube through pipe 16 to remove water from the outside of the tube.

The cooled tube then passes through the pair of nip rolls 3 which control the speed at which the tube is travelling, and through banks of infra-red heaters 17 and 18 which raise the temperature of the tube to that required for stretching. The tube is then stretched in the direction transverse to its direction of extrusion by air under pressure introduced through pipe 19 to inflate the tube, and is simultaneously stretched longitudinally by a pair of nip rolls 20 which collapse, and form an air-tight seal across, the inflated tube, and withdraw the collapsed tube at a rate greater than that at which the extruded tube is withdrawn from the extrusion die by the nip rolls 3.

Despite the presence of annular sealing members 13 and 15 it is difficult to remove sufficient moisture from the external surface of tube 1 to enable nip rolls 3 to maintain an adequate grip on the tube. This difficulty is particularly significant during the start-up procedure when the extruded tube is being threaded through the film-forming system prior to blowing of the "bubble". In these circumstances the external surface of the tube is likely to be relatively moist, nip rolls 3 will fail to withdraw the tube, and the latter will adhere firmly to mandrel 5 necessitating shut-down of the plant for refurbishing or replacement of the mandrel.

Accordingly, and as shown clearly in FIG. 2, each of the cylindrical nip rolls 3 is provided with a fluid-(liquid)shedding, axially-central portion 4 of increased diameter for engagement with part only of the external surface of the collapsed tube, so that the latter adopts a dumb-bell configuration permitting the passage of inflating gas in a downstream direction through a discrete residual channel 30 within each lateral zone of the collapsed tube.

Each fluid-shedding surface, of which only one is shown in detail, comprises a series of intersecting, helical grooves 31 machined into the roll surface to provide a regular pattern of rhombic lands 32. As nip rolls 3 co-rotate, in the direction of the arrows, moisture, or fluid, at the interface 33 between the tube and each roll is wiped into the grooves and gradually conveyed within the grooves in a generally axial direction to an edge 34, 35 of the fluid-shedding surface where it does not impede the gripping action of the roll.

Replacement of the conventional, smooth-surfaced nip rolls of a particular film-forming unit by a system of the kind described with reference to the drawings has significantly increased the yield of acceptable film produced within a fixed period of time.

The invention is further illustrated by reference to the following Examples in which biaxially oriented polypropylene film was produced using an apparatus of the kind illustrated in the drawings.

EXAMPLE 1

Polypropylene was downwardly extruded at a rate of 700 lbs/hour (320 kg/hour) through an annular extrusion die having a diameter of 6.5 inches (165 mm) and a die gap of 0.060 inch (1.52 mm). The mandrel, which had a matt surface, was tapered over its length of 48 inches (1219 mm) from 6.25 inches (158.7 mm) at its upstream end to 6.125 inches (155.6 mm) at its downstream end.

Cold water overflowed from the upstream end of the mandrel at a rate of 50 gallons/hour (227 liters/hour) to form an annular sheath between the mandrel and tube. Water from this sheath accumulated in space 7 and was removed through the centre of the mandrel. Cooling water was also circulated through the interior of the mandrel.

Bath 10 was supplied with cold water at a rate of 800 gallons/hour (3636 liters/hour) to cool the external surface of the tube.

The cooled tube was withdrawn from the mandrel at a rate of 35.7 feet/minute (10.9 m/minute) by nip rolls 3 of the kind illustrated in FIG. 2, each roll having a hard rubber collar 4 of diameter 6 inches (15 cm) and axial width 6 inches (15 cm) so that only the central portion of the tube was collapsed. The surface of each collar was provided with a regular pattern of rhombic lands occupying approximately 80% of the collar surface. Linear nip pressure was maintained at a value of 25 kg/cm or 140 lb/in.

The tube was then heated to a temperature of about 160° C. by infra-red heaters 17 and 18, and inflated to form a bubble of diameter 46.5 inches (1181 mm) by air introduced through pipe 19. The tube was also stretched in the longitudinal direction of extrusion by smooth-surfaced nip rolls 20 rotating at a peripheral speed of 260 feet/minute (79 m/minute).

Film of satisfactory quality was produced for a period of 14 days, without disruption of the process resulting from slippage of the nip rolls on the slightly moist external surface of the tube.

EXAMPLE 2

This is a comparative Example not according to the invention.

The procedure of Example 1 was repeated except that fluid-shedding rolls 3 were replaced by conventional smooth-surfaced steel nip rolls.

Over a period of 8 days, disruption of the process caused by lack of roll traction, and consequent "locking-on" of the tube to the mandrel, occurred on 5 occasions. That is, on 5 occasions the traction exerted by the smooth-surfaced nip rolls was insufficient to withdraw the tubular extrudate from the mandrel, thereby allowing a mass of molten polymer to accumulate and solidify around the mandrel and nip rolls. On at least two other occasions within the 8 day period the cooled tube was observed to slip between the nip rolls, although prompt remedial action prevented "lock-on".

I claim:

1. An apparatus for the production of a polymeric tubular film comprising an annular orifice for extruding a polymeric material in the form of a tube;

an internal mandrel coaxial with, and of diameter less than that of, the annular orifice for cooling and dimensioning the extruded tube;

cooling means for supplying cooling fluid to the external surface of the tube in the region of the mandrel;

withdrawing means downstream of said cooling means for withdrawing the cooled tube, said withdrawing means comprising a fluid-shedding movable surface means for drivingly engaging the external surface of the tube and for dispersing fluid from the interface between said withdrawing means and said tube external surface in a generally outward direction from a central region of said fluid-shedding surface means to an edge thereof; and means downstream of the withdrawing means for stretching the withdrawn tube to form an oriented tubular film.

2. An apparatus according to claim 1 wherein said cooling means comprises an annular, liquid coolant bath for cooling the external surface of the tube in the region of the mandrel.

3. An apparatus according to claim 1 wherein the withdrawing means comprises a pair of cooperating nip rolls, said surface means comprising the tube-engaging surface of at least one of said rolls and said surface for displacing fluid from the interface between the tube and said at least one roll.

4. An apparatus according to claim 3 wherein the tube-engaging surface of said at least one nip roll is grooved to provide a pattern of lands on said surface.

5. An apparatus according to claim 3 wherein a regular pattern of rhombic lands is provided on said roll surface.

6. A method of producing a polymeric tubular film comprising the steps of extruding a polymeric material in the form of a tube;

cooling the extruded tube by supplying a cooling fluid to the external surface of the tube;

withdrawing the cooled tube by engaging the external surface thereof with a moving fluid-shedding surface that disperses fluid from the interface between the fluid-shedding surface and the tube external surface in a generally outward direction from a central region of the fluid-shedding surface to an edge thereof; and stretching the withdrawn tube to form an oriented tubular film.

7. A method according to claim 6 wherein said withdrawing step is practiced by withdrawing the cooled tube by means of a pair of cooperating nip rolls rotating in engagement with the external surface of the tube, the tube-engaging surface of one or each of said rolls providing the fluid-shedding surface for displacing fluid from the interface between the tube and that roll.

8. A method according to claim 6 wherein said withdrawing step is further practiced by providing the tube-engaging surface of one or each of said rolls as grooved to displace fluid from the interface between the tube and that roll outwardly to the ends of the nip in a direction substantially parallel to the axis of rotation of that roll.

9. A method according to claim 6 wherein the polymeric material is selected from the group comprising a propylene homopolymer, a propylene copolymer containing up to 15% by weight of the copolymer of an unsaturated monomer, and a propylene copolymer containing from 5 to 20% by weight of the copolymer of an alpha-olefin having from 4 to 10 carbon atoms in its molecule.

* * * * *